United States Patent [19]

Kimura et al.

[11] Patent Number: 5,420,497
[45] Date of Patent: May 30, 1995

[54] DIRECT CURRENT POWER UNIT HAVING MAIN AND SECONDARY DIRECT CURRENT POWER SUPPLIES

[75] Inventors: Gunji Kimura, Tama; Osawa Hiroshi, Kisarazu; Shigeru Sano, Takatsuki, all of Japan

[73] Assignee: Yuasa Corporation, Japan

[21] Appl. No.: 217,935

[22] Filed: Mar. 25, 1994

[30] Foreign Application Priority Data

Mar. 25, 1993 [JP] Japan .................. 5-092433

[51] Int. Cl.$^6$ .................. G05F 1/613; H02J 7/00
[52] U.S. Cl. .................. 323/224; 307/64
[58] Field of Search ............. 323/222, 223, 224, 225, 323/226; 307/46, 48, 49, 64, 66, 69, 71, 77

[56] References Cited

U.S. PATENT DOCUMENTS

| | | | |
|---|---|---|---|
| 4,736,151 | 4/1988 | Dishner | 323/224 |
| 4,754,160 | 6/1988 | Ely | 307/64 |
| 4,812,672 | 3/1989 | Cowan et al. | 307/64 |
| 5,287,053 | 2/1994 | Hutchinson | 307/66 |
| 5,309,031 | 5/1994 | Stewart et al. | 307/66 |

Primary Examiner—R. Skudy
Assistant Examiner—Matthew V. Nguyen
Attorney, Agent, or Firm—Scully, Scott, Murphy & Presser

[57] ABSTRACT

A direct current power unit has main and secondary direct current power supplies, a serial circuit, and first and second parallel circuits. One terminal of the secondary direct current power is connected to one terminal of the main direct current power supply. The serial circuit consists of a choke coil and a first capacitor, of which each terminal is connected to each terminal of the main direct current power supply. The first parallel circuit consists of a first diode and a first switching element, of which each terminal is connected to each terminal of the first capacitor. The second parallel circuit consists of a second capacitor, a second diode, and a second switching element connected between the serial connected point of the choke coil and the first capacitor and the other terminal of the secondary direct current power supply. Each terminal of a third capacitor is connected to each terminal of the secondary direct current power supply. Direct current power is supplied to a load from each terminal of the first capacitor.

2 Claims, 1 Drawing Sheet

DIRECT CURRENT POWER UNIT HAVING MAIN AND SECONDARY DIRECT CURRENT POWER SUPPLIES

BACKGROUND OF THE INVENTION

1. Field of the Invention

The present invention relates to direct current power units, and more particularly, to direct current power units for efficiently charging a storage battery as a main direct current power supply using a solar battery or a fuel cell as a secondary direct current power supply and for supplying direct current power to a load from the main direct current power supply.

2. Background Art

An apparatus shown in FIG. 2 is known as a conventional direct current power unit which charges a storage battery as a main direct current power supply using a solar battery or a fuel cell as a secondary direct current power supply and supplies direct current power to a load from the main direct current power supply.

In FIG. 2, a secondary direct current power supply 1, a main direct current power supply 2, a load 3, a voltage detecting circuit 4, a switching element 5, and a diode 6 are provided. In FIG. 2, the secondary direct current power supply 1 is, for example, a solar battery 1 and the main direct current power supply 2 is, for example, a storage battery. In addition, the switching element 5 is, for example, a field effect transistor. The main direct current power supply 2 is charged by the secondary direct current power supply 1 via the switching element 5 and the diode 6. Both terminals of the voltage detecting circuit 4 are respectively connected to both terminals of the main direct current power supply 2. The voltage detecting circuit 4 detects the terminal voltage of the main direct current power supply 2. The switching element 5 is turned on or off by an output signal from the voltage detecting circuit 4 so as to prevent the overcharge of the main direct current power supply 2.

In the above-mentioned conventional direct current power unit, the turning-on or turning-off of the switching element 5 causes switching loss, and thereby the efficiency of charging the main direct current power supply 2 using the secondary direct current power supply 1 decreases.

SUMMARY OF THE INVENTION

In consideration of the above problems, it is an object of the present invention to provide a direct current power unit capable of efficiently charging a main direct current power supply using a secondary direct current power supply.

To satisfy this object, the present invention provides a direct current power unit comprising: a main direct current power supply; a secondary direct current power supply of which one terminal is connected to one terminal of the main direct current power supply; a serial circuit consisting of a choke coil and a first capacitor, of which each terminal is connected to each terminal of the main direct current power supply, direct current power is supplied to a load from each terminal of the first capacitor; a first parallel circuit consisting of a first diode and a first switching element, of which each terminal is connected between one terminal of the first capacitor; a second parallel circuit consisting of a second capacitor, a second diode, and a second switching element connected between the serial connected point of the choke coil and the first capacitor and the other terminal of the secondary direct current power supply; and a third capacitor, of which each terminal is connected to each terminal of the secondary direct current power supply.

According to the present invention, a positive effect is that electrical energy can be efficiently transferred from a secondary direct current power supply to a main direct current power supply. Accordingly, power efficiency increases in an electric vehicle or a solar car and the like having a chopper control apparatus as a load.

DETAILED DESCRIPTION OF THE PREFERRED EMBODIMENT

Figure 1:
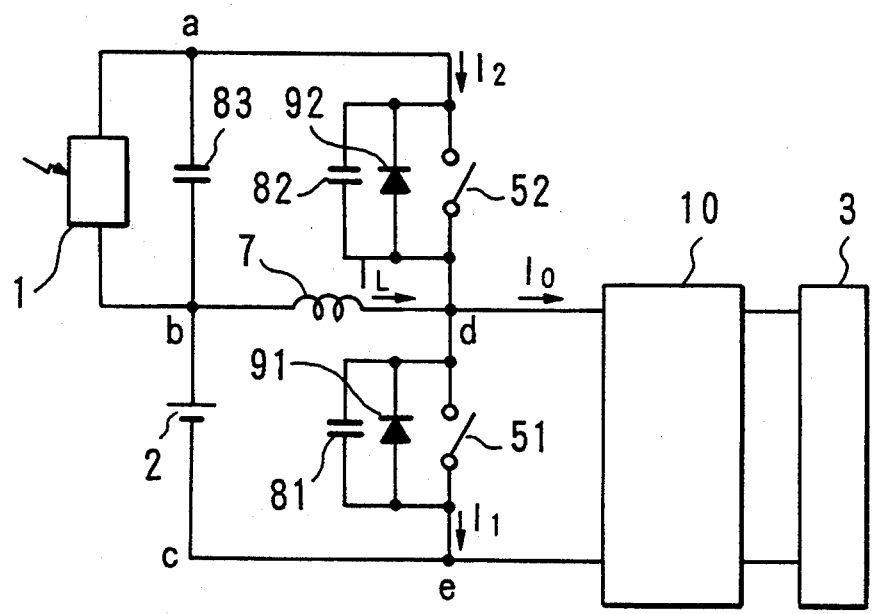
FIG. 1 is a circuit diagram showing the layout of a direct current power unit based on the preferred embodiment of the present invention.
Figure 2:
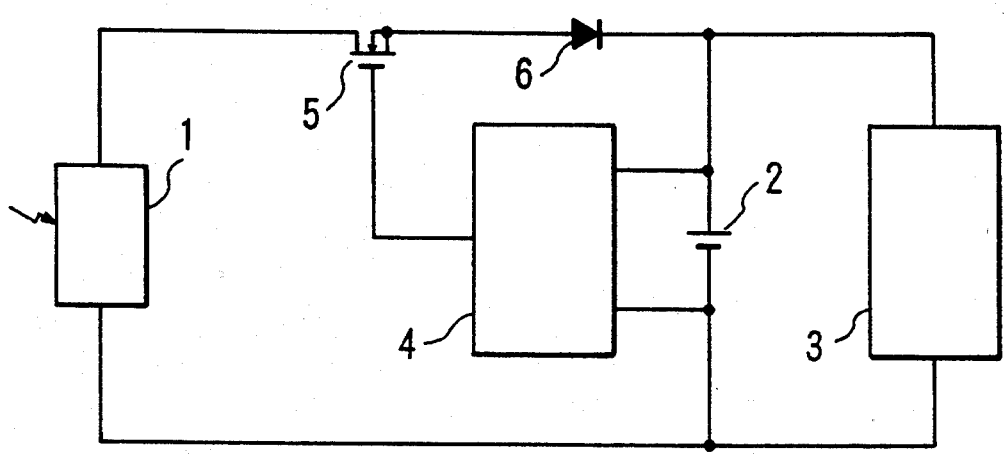
FIG. 2 is a circuit diagram showing the layout of a conventional direct current power unit.

Hereinafter, a preferred embodiment of the present invention will be explained with reference to FIG. 1. FIG. 1 is a circuit diagram showing the layout of a direct current power unit based on the preferred embodiment of the present invention. In FIG. 1, components which correspond to components in the conventional direct current power unit shown in FIG. 2 will retain the original identifying numeral.

The distinctive feature of the present invention is as follows. The main direct current power supply 2, a choke coil 7, serially connected to a first capacitor 81, and a first diode 91, parallel connected to a first switching element 51, are provided. Each terminal of the serially-connected choke coil 7 and first capacitor 81 is connected to the terminals b and c of the main direct current power supply 2. Each terminal of the parallel-connected first diode 91 and first switching element 51 is connected to the terminals d and e of the first capacitor 81. Direct current power is supplied from the terminals d and e of the first capacitor 81 to the load 3 via a control converter 10. Furthermore, the secondary direct current power supply 1, a second capacitor 82, a second diode 92, a second switching element 52, and a third capacitor 83, are provided. One terminal of the main direct current power supply 2 is connected to the terminal b of the secondary direct current power supply 1. A parallel circuit comprising the second capacitor 82, the second diode 92 and the second switching element 52 is connected between the terminal of the serial connected point of the choke coil 7 and the first capacitor 81 and the other terminal a of the secondary direct current power supply 1. The third capacitor 83 is connected between the terminals a and b of the secondary direct current power supply 1.

Next, the operation of the direct current power unit of the present invention shown in FIG. 1 will be explained. Assuming that the first switching element 51 is turned on and the second switching element 52 is turned off, current $i_L$ is conducted through the choke coil 7 from the main direct current power supply 2. Therefore, current $i_l$ is conducted through the first switching element 51, and current $i_O$ is conducted through the load 3 via the control converter 10. Since the current $1_L$ is represented by formula (1), the current $1_L$ increases with time.

$$i_L = (V_2/L) * t \qquad (1)$$

In the formula (1), L represents the inductance of the choke coil 7, and $V_2$ represents the voltage supplied by the main direct current power supply 2. Furthermore, the currents $i_1$ and $i_O$ increase in the same manner as the current $1_L$.

Then, when the first switching element 51 is turned off at the time the value of the current $i_l$ becomes $I_{10}$, the current $i_L$ through the choke coil 7 is shunted into the first capacitor 81 and the load 3 and decreases with time. When C1 represents the capacitance across the first capacitor 81, the terminal voltage of the capacitor 81, namely the voltage $V_{de}$ applied across the terminals d and e of the first capacitor 81 is represented by formula (2). Accordingly, the voltage $V_{de}$ increases with time.

$$V_{de}=(I_{10}/C1)*t \qquad (2)$$

Next, when the voltage $V_{de}$ becomes larger than the sum of the voltages $V_2$ supplied by the main direct current power supply 2 and the voltage $V_1$ supplied by the secondary direct current power supply 1, the second diode 92 is turned on and thereby the voltage $V_{de}$ is clamped. Therefore, the current through the first capacitor 81 circulates in the loop circuit comprising the second diode 92, the parallel circuit consisting of the second direct current power supply 1 and the third capacitor 83, and the choke coil 7.

In the above-described operation mode, when the second switching element 52 is turned on, since the voltage applied across the second switching element 52 Is forward bias voltage of the second diode 92, zero-volt switching can be realized. Moreover, the electrical energy accumulated in the third capacitor 83 is returned into the choke coil 7 via the second switching element 52 and is supplied to the load 3 via the control converter 10. Next, when the switching element 52 is turned off at the time the value of the current $i_2$ through the second switching element 52 becomes $I_{20}$, the current through the choke coil 7 is conducted through the second capacitor 82, and thereby the electric potential at the terminal d becomes zero.

Accordingly, when the first switching element 51 is turned on while the voltage $V_{de}$ applied across the terminals d and e is zero, the zero-volt switching can be realized. Therefore, the electrical energy of the secondary direct current power supply 1 accumulated in the choke coil 7 is transferred to the main direct current power supply 2 via the first switching element 51 and thereby the main direct current power supply 2 can be charged by the secondary direct current power supply 1. Then, the electrical energy is accumulated in the choke coil 7 by the main direct current power supply 2. The above-mentioned operation is then repeated.

In the above-described embodiment of the present invention, the transfer of the electrical energy from the secondary direct current power supply 1 to the main direct current power supply 2 can be controlled by controlling the on/off ratio of the first and second switching elements 51 and 52. Accordingly, in the case where a storage battery is used as the main direct current power supply 2 and a solar battery or a fuel cell is used as the secondary direct current power supply 1, the charging of the main direct current power supply 2 can be controlled in response to the generated energy in the secondary direct current power supply 1.

Furthermore, in the above-described embodiment of the present invention, since the zero-volt switching of the first and second switching elements 51 and 52 can be realized based on partial resonance by the first and second capacitors 81 and 82, and the choke coil 7, the electrical energy of the secondary direct current power supply 1 can be efficiently transferred to the main direct current power supply 2. Simultaneously, when the switching element built in the control converter 10 is turned on at the time the voltage applied across the switching element becomes zero, direct current power can be efficiently supplied to the load 3.

What is claimed is:

1. A direct current power unit comprising:
   a main direct current power supply;
   a secondary direct current power supply of which one terminal is connected to one terminal of said main direct current power supply;
   a serial circuit including a choke coil connected serially at a serial connected point with a first capacitor, of which each terminal is connected to each terminal of said main direct current power supply, direct current power is supplied to a load from each terminal of said first capacitor;
   a first parallel circuit including a first diode and a first switching element, of which each terminal is connected to each terminal of said first capacitor;
   a second parallel circuit including a second capacitor, a second diode and a second switching element connected between the serial connected point of said choke coil and said first capacitor and the other terminal of said secondary direct current power supply; and
   a third capacitor, of which each terminal is connected to each terminal of said secondary direct current power supply.

2. A direct current power unit in accordance with claim 1 above wherein the timing of the turning on and turning off of said first and second switching elements is controlled based on partial resonance by said choke coil and said first and second capacitors.

* * * * *